United States Patent [19]

Takaoka et al.

[11] Patent Number: 5,058,626
[45] Date of Patent: Oct. 22, 1991

[54] HYDRAULIC PRESSURE CONTROL VALVE

[75] Inventors: Tokuro Takaoka; Tsuto Sasaki; Yukio Kobayashi, all of Saitama; Kouichi Saitoh, Shizuoka; Satoshi Hamano, Kanagawa; Toshiya Tatumoto, Shizuoka, all of Japan

[73] Assignees: Honda Giken Kogyo Kabushiki Kaisha, Tokyo; Seiki Giken Kogyo Kabushiki Kaisha, Hadano, both of Japan

[21] Appl. No.: 627,909

[22] Filed: Dec. 17, 1990

Related U.S. Application Data

[63] Continuation of Ser. No. 406,671, Sep. 13, 1989, abandoned.

[30] Foreign Application Priority Data

Sep. 14, 1988 [JP] Japan .................................. 63-120796

[51] Int. Cl.⁵ .............................................. F15B 13/02
[52] U.S. Cl. .......................... 137/625.66; 137/625.69
[58] Field of Search ...................... 137/625.69, 625.66; 180/143

[56] References Cited

U.S. PATENT DOCUMENTS

| | | | |
|---|---|---|---|
| 3,018,041 | 1/1962 | Browell | 251/126 X |
| 3,589,401 | 6/1971 | Harding | 137/625.67 |
| 3,964,372 | 6/1976 | Chatterjea | 251/126 X |
| 4,069,843 | 1/1978 | Chatterjea | 137/625.69 |
| 4,139,985 | 2/1979 | Ruhl et al. | 137/625.69 X |
| 4,923,170 | 5/1990 | Takaoka et al. | 251/121 |

FOREIGN PATENT DOCUMENTS 52-140129 11/1977 Japan .

Primary Examiner—Gerald A. Michalsky
Attorney, Agent, or Firm—Armstrong, Nikaido, Marmelstein, Kubovcik & Murray

[57] ABSTRACT

A hydraulic pressure control valve includes a valve body having a slide bore with a circular cross-section, an inlet port opened in an inner surface of the slide bore, a control pressure port and an outlet port at axially spaced-apart distances in this sequence; a valve spool axially slidably fitted in the valve body; and a first variable orifice and a second variable orifice both formed between the valve body and the valve spool. The first variable orifice controls the degree of communication between the inlet port and the control pressure port, and the second variable orifice controls the degree of communication between the control pressure port and the outlet port. In this hydraulic pressure control valve, the valve spool has smaller diameter portions coaxially formed therein to define annular oil passages between the inner surface of the slide bore and the valve spool and each smaller diameter portion has an outer diameter set uniformly over the axially entire length thereof.

3 Claims, 2 Drawing Sheets

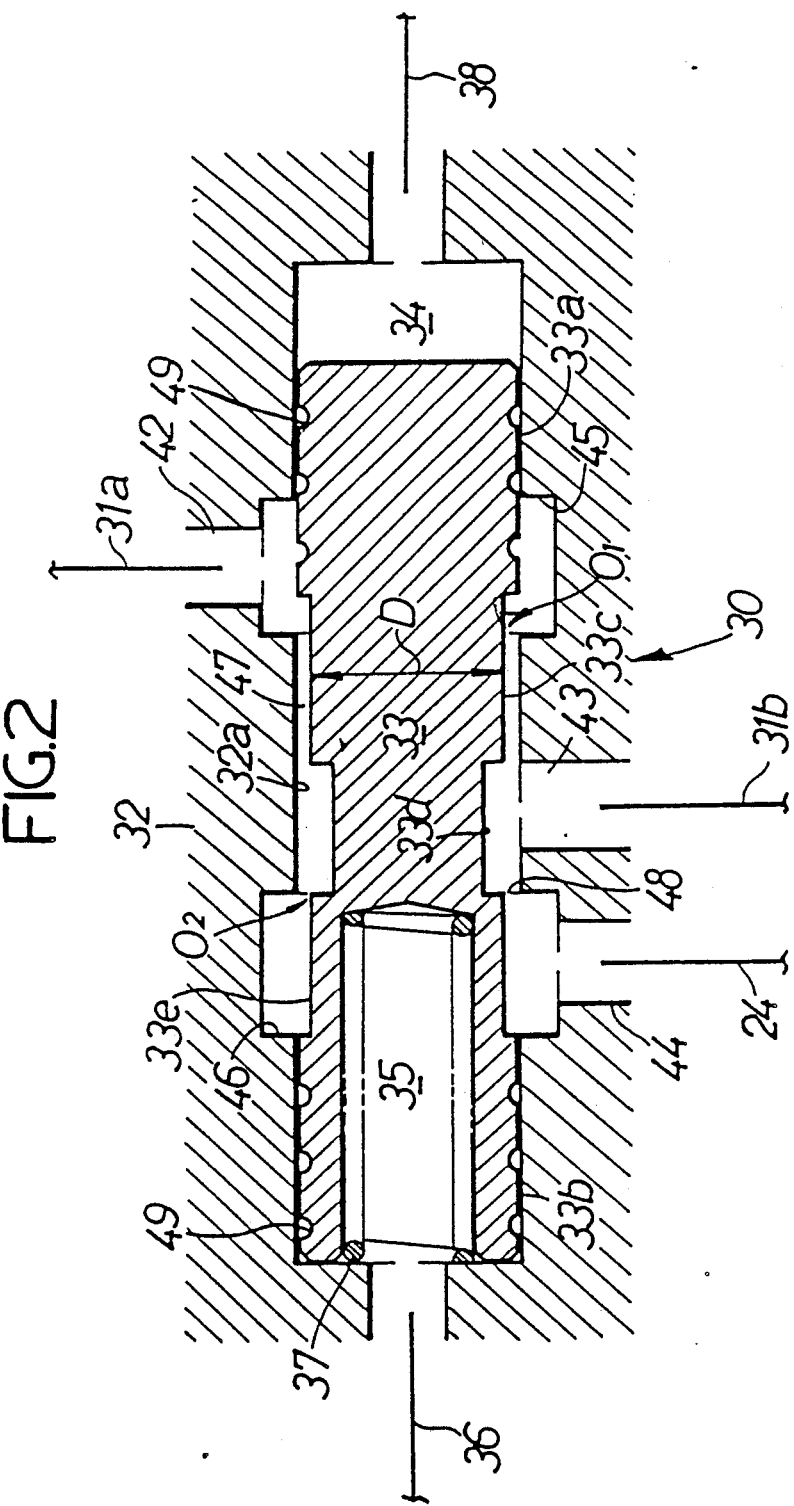

HYDRAULIC PRESSURE CONTROL VALVE

This application is a continuation of application Ser. No. 406,671 filed Sept. 13, 1989, now abandoned.

BACKGROUND OF THE INVENTION

1. Field of the Invention

The present invention relates to a hydraulic pressure control valve comprising a valve body having a slide bore with a circular cross-section, an inlet port opened in an inner surface of the slide bore, a control pressure port and an outlet port at axially spaced-apart distances in this sequence; a valve spool axially slidably fitted in the valve body; and a first variable orifice and a second variable orifice both formed between the valve body and the valve spool, the first variable orifice controlling the degree of communication between the inlet port and the control pressure port, and the second variable orifice controlling the degree of communication between the control pressure port and the outlet port.

2. Description of the Prior Art

Such a valve having two variables orifices formed between a valve body and a valve spool is known, for example, from Japanese Patent Application Laid-open No. 140129/77.

In the above prior art, however, the variable orifice is defined by a notch provided in the valve spool and an annular groove provided in the inner surface of the slide bore in the valve body. In order to improve the dimensional accuracy of the variable orifice, it is necessary to machine the notch in the valve spool and the annular groove in the inner surface of the slide bore, in each case, with a good accuracy, which is troublesome.

SUMMARY OF THE INVENTION

The present invention has been accomplished with such circumstances in view, and it is an object of the present invention to provide a hydraulic pressure control valve wherein the machining is facilitated for providing an improvement in dimensional control accuracy for a variable orifice.

To attain the above object, according to the present invention, there is provided a hydraulic pressure control valve comprising a valve body having a slide bore with a circular cross-section, an inlet port opened in an inner surface of the slide bore, a control pressure port and an outlet port at axially spaced-apart distances in this sequence; and a first variable orifice and a second variable orifice both formed between the valve body and the valve spool, the first variable orifice controlling the degree of communication between the inlet port and the control pressure port, and the second variable orifice controlling the degree of communication between the control pressure port and the outlet port, wherein the valve spool has smaller diameter portions coaxially formed therein to define annular oil passages between the inner surface of the slide bore and the valve spool so as to cooperatively form the first and second orifices with the valve body and each of said smaller diameter portions having an outer diameter set uniformly over the axially entire length thereof.

With the above construction, each of the smaller diameter portions has a uniform outer diameter and therefore, it is possible to perform a high accuracy machining only by a control of the feed per stroke of a cutting tool during machining. This makes it possible to easily improve the dimensional accuracy for the first and second variable orifices, thereby ensuring that the variation can be easily suppressed in characteristics of the variable orifices.

The above and other objects, features and advantages of the invention will become apparent from a reading of the following description of the preferred embodiment, taken in conjunction with the accompanying drawings.

BRIEF DESCRIPTION OF THE DRAWINGS

Drawings illustrate one embodiment of the present invention, wherein

FIG. 2 is an enlarged longitudinal sectional view of a hydraulic pressure control valve according to the present invention.

DESCRIPTION OF THE PREFERRED EMBODIMENT

Figure 1:
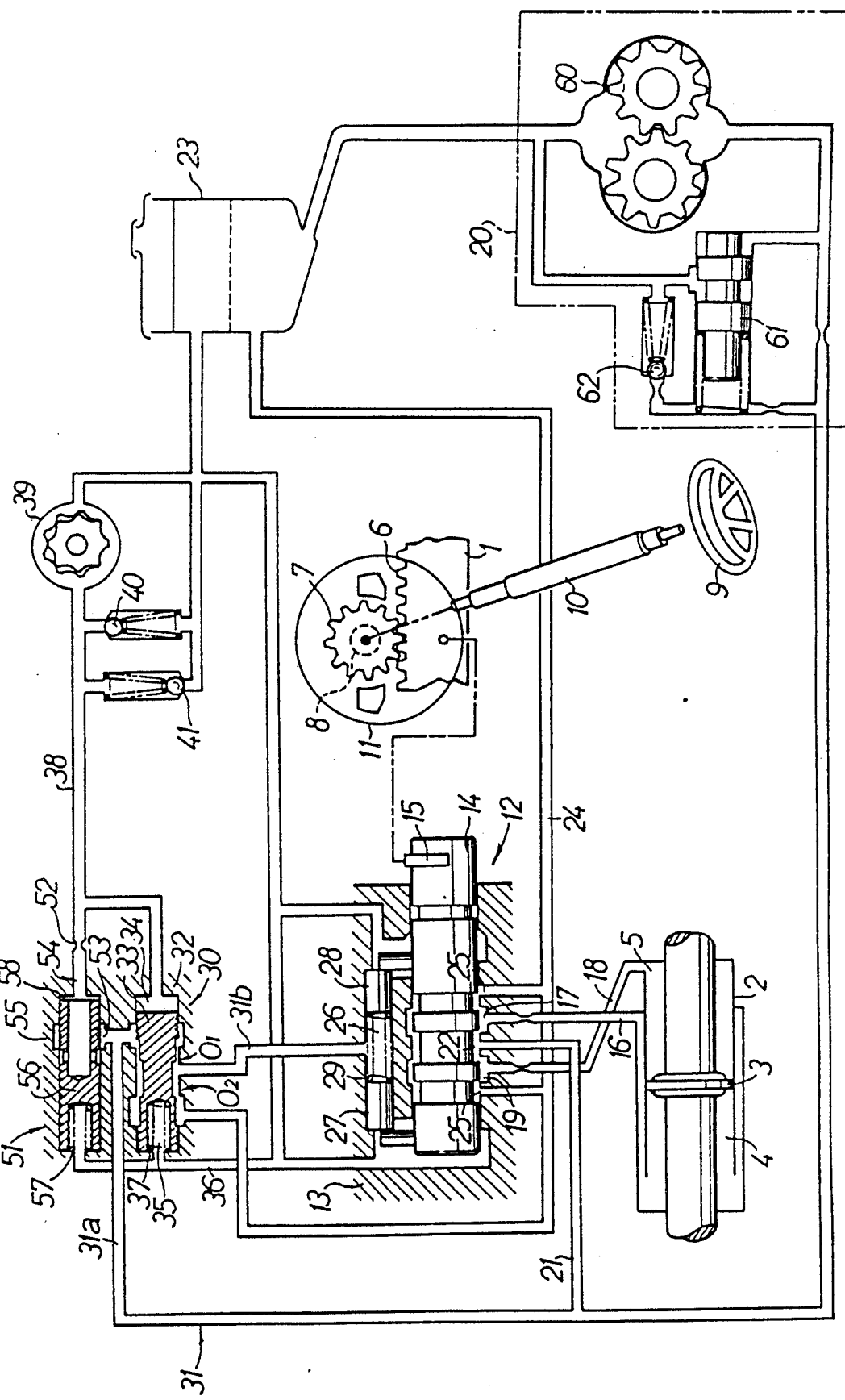
FIG. 1 is a diagram of a hydraulic pressure circuit using the present invention.

The present invention will now be described by way of one embodiment wherein the present invention is applied to a vehicle speed-responsive type hydraulic power steering device. Referring first to FIG. 1, a power cylinder 2 is formed at the middle of a rack rod 1 connected to a pair of left and right steering wheels (not shown). The interior of the power cylinder 2 is divided into a pair of left and right hydraulic chambers 4 and 5 by a piston 3 which is integrally provided on the rack rod 1.

A pinion 7 is meshed with a rack 6 mounted on the rack rod 1. A steering shaft 10 connected to steering wheel 9 is coupled to a pinion shaft 8 having the pinion 7 mounted thereon. The pinion 7 is carried by a pinion holder Il having a rotational center at a point eccentric from the center of rotation of the pinion 7. Thus, when the load on the rack roil 1 has been increased by rotation of the pinion 7 with the turning of the steering shaft 10, a reaction force acts on the pinion 7 so as to cause the pinion 7 to move along an axis of the rack rod 1, and in response to this, the pinion holder 11 is turned.

A directional control valve 12 is operatively connected to the pinion holder 11 to change-over to shift positions in response to the turning of the steering shaft 10. The directional control valve 12 comprises a valve spool 14 which is contained in a valve box 13 and connected through a pin 1 to the pinion holder 11 at a point offset from the rotational center thereof.

The valve box 13 is provided with a port 17 communicating with one of the hydraulic chambers 4 in :he power cylinder 2 through an oil passage 16, a port 19 communicating with the other hydraulic chamber 5 in the power cylinder 2 through an oil passage 18, an oil feed port 22 connected to a working; g oil pressure source 20 through an oil feed passage 21, and an il discharge port 25 connected to an oil tank 23 through an oil discharge passage 24. Moreover, the valve spool 14 is shiftable between a position in which the oil feed port 22 is put into communication with the port 19 and the oil discharge port 25 is put into communication with the port 17, and a position in which the oil feed port 22 is put into communication with the port 17 and the oil discharge port 25 is put into communication with the port 19.

Around the periphery of the valve spool 14, a plurality of e.g., two hydraulic reaction chambers 2 are provided in the valve box 13 (only one being shown). The hydraulic reaction chambers 26 are defined between a pair of plungers 27 and 28 which are opposed to each other for movement in a direction parallel to the valve spool 14. A spring 29 is contained in each hydraulic reaction chamber 26 for biasing the plunger 27 and 28 away from each other. Moreover, the plungers 27 and 2( are engaged with the valve spool 14, so that a hydraulic pressure supplied to the hydraulic reaction chambers 26 biases the valve spool 14 toward a neutral position.

Referring also to FIG. 2, the hydraulic reaction chamber 26 are connected with the oil feed passage 21 through a communication oil passage 31 which includes a boosting regulator valve 30, at the middle thereof, serving as a hydraulic pressure control valve according to the present invention. The boosting regulator valve 30 comprises a valve spool 33 slidably fitted in a valve body 32 which has a slide bore 32a va circular cross-section. A pilot hydraulic chamber 34 is defined between one end of the valve spool 33 and one end wall of the slide bore 32a, and a spring chamber 35 is defined between the other end of the valve spool 33 and the other end wall of the slide bore 32a.

The spring chamber 35 is communicating with the oil tank 23 through a release oil passage 36, and has a spring 37 contained therein for biasing the valve spool 33 toward the pilot hydraulic chamber 34. An intake passage 38 is connected at its one end to the pilot hydraulic chamber 34 and at the other end to an intake port of a vehicle speed sensor 39 which increases an intake amount depending upon an increase in vehicle speed. A discharge port of the vehicle speed sensor 39 is connected to the oil tank 23, and a relief valve 40 and a check valve 41 are connected to the intake and discharge ports of the vehicle speed sensor 39.

An inlet port 42, a control pressure port 43 and an outlet port 44 are provided in the valve body 32 at spaced-apart distances in sequence from the pilot hydraulic chamber 34 toward the spring chamber 35. An upstream portion 31a of the communication oil passage 31 is connected to the inlet port 42, a downstream portion 31b of the communication oil passage 31 is connected to the control pressure port 43 and the oil discharge passage 24 is connected to the outlet port 44. An inner surface of the slide bore 32a is provided with an annular groove 45 communicating with the inlet port 42, at a place closer to the pilot hydraulic chamber 34, and with an annular groove 46 communicating with the outlet port 44, at a place closer to the spring chamber 35. Between both the annular grooves 45 and 46, the control pressure port 43 is opened into the slide bore 32a.

Between the valve body 32 and the valve spool 33, there are a first variable orifice 01 for controlling the degree of communication between the inlet port 42 and the control pressure-port 43, and a second variable orifice 02 for controlling the degree of communication between the control pressure port 43 and the outlet port 44. The orifices 01 and 02 are made by forming annular oil passages 47, 48, respectively, defined between the inner surface of the slide bore 32a and the valve spool 33, at locations between the annular groove 45 and the control pressure port 43, and between the control pressure port 43 and the annular groove 46, respectively. The valve spool 33 has smaller diameter portions 33c and 33e which are coaxially provided therein and which define the annular oil passages 47 and 48 between the inner surface of the slide bore 32a and the valve spool 33 so as to cooperatively form the orifices 01 and 02 with the inner surface of the slide bore 32a of the valve body 32. More specifically, the smaller diameter portions 33c and 33e are provided in the valve spool 33 with an outside diameter D uniform over the axially entire length of the portions 33c and 33e between a land portion 33a provided at one end of the valve spool 33 to come into slide contact with the inner surface of the slide bore 32a on the side of the pilot hydraulic chamber 34 and a land portion 33b provided at the other end of the valve spool 33 to come into a slide contact with the inner surface of the slide bore 32a on the side of spring chamber 35. Between the smaller diameter portions 33c and 33e, there is an annular recess 33d which leads to the control pressure port 43 irrespective of the axial movement of the valve spool 33. A plurality of stick-preventing grooves 49 are annularly provided in an outer surface of each of the land portions 33a and 33b of the valve spool 33 to prevent the sticking between such outer surface and the inner surface of the slide bore 32a.

In such boosting regulator valve 30, the hydraulic pressure in the annular recess 33d, i.e., the hydraulic pressure in the hydraulic reaction chamber 26 is determined by a resistance ratio between the first and second orifices 01 and 02, provided that the hydraulic pressure supplied to the inlet port 42 is constant. The ratio of resistances between the orifices 01 and 02 depends upon the ratio of the distance from a location of the smaller diameter portion 33c corresponding to an inner end edge of the annular groove 45 to the annular recess 33d, to the distance from a location of the smaller diameter portion 33e corresponding to an inner end edge of the annular groove 46 to the annular recess 33d. When the valve spool 33 moves leftward as viewed in FIG. 2 in response to an increase in hydraulic pressure in the pilot hydraulic chamber 34 to increase the resistance of the first variable orifice 01, the hydraulic pressure in the hydraulic reaction chambers 26 is reduced. On the other hand, when the valve spool 33 moves rightward in response to a reduction in hydraulic pressure in the pilot hydraulic chamber 34 to increase the resistance of the second orifice 02, the hydraulic pressure in the hydraulic reaction chambers 26 is increased.

It should be noted that the intake passage 38 is connected to the pilot hydraulic chamber 34 as described above, and the upstream portion 31a of the communication oil passage 31 is connected to the pilot hydraulic chamber 34 through a pressure regulating valve 51 and through an orifice 52. The pressure regulating valve 51 comprises a valve spool 56 which is slidably received in a valve box 55 having an inlet port 53 leading to the upstream portion 31a and an outlet port 54 leading to the pilot hydraulic chamber 34 via the orifice 52, and which switchably puts the inlet port 53 and the outlet port 54 into and out of communication with each other. The valve spool 56 is biased by a spring 57 in a valve-opening direction. The valve spool 56 is also biased in a valve-closing direction by the hydraulic pressure in a pilot hydraulic chamber 58, and the hydraulic pressure in the outlet port 54 acts on the pilot hydraulic chamber 58. The pressure regulating valve 51 is operated to maintain the hydraulic pressure in the outlet port 54, i.e., in the pilot hydraulic chamber 58 constant.

In such a construction of connection of the boosting regulator valve 30, the vehicle speed sensor 39 and the pressure regulating valve 51, the following equation is established:

$$Q = kqV = CA(P2 - P1)^{\frac{1}{2}} \qquad (1)$$

-continued $$P1 = P2 - (kqV/CA)^2$$
$$= P2 - KV^2$$

wherein K, k and C are each a constant; V is a vehicle speed; q is an amount of working oil pumped per rotation of the vehicle speed sensor 39; A is an opened area of the orifice 52; P1 is a hydraulic pressure in the pilot hydraulic chamber 34; P2 is a hydraulic pressure in the pilot hydraulic chamber 58; and Q is a flow rate of a working oil through the orifice 52.

As apparent from the equation (1), the hydraulic pressure in the pilot hydraulic chamber 34 in the boosting regulator valve 30 is reduced as the vehicle speed is increased.

The working oil pressure source 20 comprises a hydraulic pump 60 operatively associated with an engine (not shown), a flow rate regulating valve 61 for maintaining constant the amount of working oil discharged into the oil feed passage 21, and a relief valve 62 for preventing the hydraulic pressure in the oil feed passage 21 from excessively increasing.

The operation of this embodiment will be described below. When the vehicle is stopped, the vehicle speed sensor 39 is also inoperative, but the hydraulic pump 60 is being driven by the engine. In the boosting regulator valve 30, the hydraulic pressure in the pilot hydraulic chamber 34 is at maximum, and the valve spool 33 has been moved leftward, resulting in an increased resistance of the first variable orifice 01. In addition, the hydraulic reaction chamber 26 is in communication with the oil discharge passage 24 through the second variable orifice 02 having a smaller resistance and therefore, the hydraulic pressure in the hydraulic reaction chamber 26 is extremely low.

When the steering shaft 10 is turned in such condition, the pinion holder 11 is turned to actuate the valve spool 14 of the directional control valve 12 to one direction. This causes the hydraulic pressure to be supplied into one of the hydraulic chambers 4 and 5 in the power cylinder 2, while causing the hydraulic pressure in the other hydraulic chamber to escape into the oil discharge passage 24, thereby providing a power assistance to a steering power. In this case, the hydraulic pressure in the hydraulic reaction chamber 26 is low and hence, the reaction force applied to the valve spool 14 of the directional control valve 12 is smaller, leading to a lightened steering power.

When the vehicle is travelling, the boosting regulator valve 30 is operated depending upon the rotation of the vehicle speed sensor 39, thereby allowing the corresponding hydraulic pressure to act on the hydraulic reaction chamber 26. This ensures that the higher the vehicle speed, the heavier the steering power will become.

In the boosting regulator valve 30, the first and second variable orifices 01 and 02 are formed by the smaller diameter portions 33c and 33e provided in the valve spool 33 and the inner surface of the slide bore 32a in the valve body 32. The control for the accuracy of the outside diameter D in the smaller diameter portions 33c and 33e as a forming factor common to the orifices 01 and 02 only requires the control of the feed per stroke of a cutting tool, thereby ensuring that the machining can be facilitated and the dimensional accuracy can be improved. Moreover, if the smaller diameter portions 33c and 33e are concurrently machined, the errors in sizes of the smaller diameter portions 33c and 33e are the same and hence, it is possible to easily suppress a variation in characteristics of the variable orifices 01 and 02.

Although the above embodiment has been described as being constructed such that the valve spool 33 of the boosting regulator valve 30 is operated by a balance between the hydraulic oil pressure in the pilot hydraulic chamber 34 and the force provided by the spring 37, it is to be understood that the present invention is also applicable to a construction in which the valve spool 33 is driven by a solenoid.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claim in determining the full scope of the invention.

What is claimed is:

1. A hydraulic pressure control valve comprising a valve body having a slide bore with a circular cross-section, an inlet port, a control pressure port and an outlet port which are opened in an inner surface of the slide bore at axially spaced-apart distances in this sequence; a valve spool axially slidably fitted in the valve body; and a first variable orifice and a second variable orifice both formed between the valve body and the valve spool, the first variable orifice controlling the degree of communication between the inlet port and the control pressure port, and the second variable orifice controlling the degree of communication between the control pressure port and the outlet port, wherein the valve spool has smaller diameter portions coaxially formed therein to define annular oil passages between the inner surface of the slide bore and the valve spool so as to cooperatively form the first and second variable orifices with the valve body wherein said smaller diameter portions have outer diameters set uniformly over the entire axial length thereof and wherein sad outer diameters are set equal to each other, said smaller diameter portions being connected to each other through an annular recess located between said smaller diameter portions, wherein an outer diameter of said annular recess is smaller than said outer diameters of said smaller diameter portions.

2. A hydraulic pressure control valve according to claim 1, wherein a pilot hydraulic chamber is defined between one of opposite ends of the valve spool and one of opposite end walls of the slide bore, a spring chamber is defined between another end of the valve spool and another end wall of the slide bore, and said spring chamber has a spring contained therein for biasing the valve spool toward said pilot hydraulic chamber.

3. A hydraulic pressure control valve according to claim 1, wherein when said valve spool is in abutment against either of opposite end walls of the slide bore, both the first and second variable orifices are still effective to allow a restricted flow of a hydraulic fluid therethrough, respectively.

* * * * *